United States Patent Office 3,492,282
Patented Jan. 27, 1970

3,492,282
CONTROLLING STRUCTURE OF POLYBUTA-
DIENE PREPARED WITH NICKEL-BASED
CATALYST SYSTEM
Rudolf H. Gaeth, Lake Jackson, Tex., assignor to Phillips
Petroleum Company, a corporation of Delaware
No Drawing. Filed Dec. 4, 1967, Ser. No. 687,458
Int. Cl. C08f 3/18
U.S. Cl. 260—94.3                                9 Claims

ABSTRACT OF THE DISCLOSURE

In the polymerization of 1,3-butadiene, a polymer having high vinyl content, intermediate trans content and virtually no cis content is obtained by using a catalyst that forms on mixing components comprising (1) molybdenum pentachloride, (2) a nickel component, and (3) a lithium hydride or organometallic compound, and a mono- or di-ether adjuvant.

---

This invention relates to the polymerization of 1,3-butadiene. In another aspect this invention relates to a method of controlling the microstructure of polybutadiene. In another aspect, the invention relates to a novel polymer of 1,3-butadiene.

Several different catalyst systems are known in the art for the polymerization of 1,3-butadiene. By using certain of these known catalyst systems, it is possible to produce polymers having high cis, high trans, or high vinyl structures. It has not been possible, however, to reduce the cis content of such polymers to virtually zero.

It has now been discovered that 1,3-butadiene is polymerized to form a trans-vinyl polymer by using a catalyst system that forms on mixing materials comprising molybdenum pentachloride, a nickel component, and a lithium aluminum hydride or organometallic compound and a mono- or di-ether. By varying the amount of ether in the polymerization system, it is possible to produce polymers with high vinyl, intermediate trans, and virtually no cis content. Low cis, high vinyl, trans polymers have particularly good ozone resistance, and low heat buildup properties and are useful in tire tread and carcass applications.

It is an object of this invention to provide a process for the polymerization of 1,3-butadiene. It is another object of this invention to provide a process for producing polybutadiene having a controlled structural configuration. It is another object of this invention to provide a method of producing polymers of 1,3-butadiene having essentially no cis content. It is a further object of this invention to produce a novel trans-vinyl polymer of 1,3-butadiene.

Other aspects, advantages and objects of this invention will be apparent to those skilled in the art upon studying the accompanying disclosure and claims.

The polymerization catalyst used in the process of this invention is formed on mixing materials comprising molybdenum pentachloride, a nickel component, and a lithium aluminum hydride or organometallic compound.

The organometallic compounds and lithium aluminum hydrides that can be used in the process of this invention are compounds having the formula $R_mAlCl_n$, $LiAlH_xR_{(4-x)}$ or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, calcium, zinc, cadmium, aluminum, gallium, or indium, and $y$ is an integer equal to the valence of the metal. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triethylaluminum, triisobutylaluminum, tri-n-eicosylaluminum, triphenylaluminum, methylaluminum sesquichloride, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, n - butyllithium, 4 - tolylaluminum dichloride, diphenylaluminum chloride, 2-naphthyllithium, diethylmagnesium, disphenylmagnesium, trimethylgallium, diethylphenylgallium, tribenzylgallium, 4-methylcyclohexyl potassium, benzylthium, n-eicosyllithium, phenylsodium, cyclohexylpotassium, isobutylrubidium, n-nonylcesium, diethylberyllium, diphenylberyllium, diethylzinc, dicyclopentylzinc, di-n-propylcadmium, dibenzylcadmium, trimethylindium, triphenylindium, and the like.

The nickel component used in our invention can be metallic nickel having a large surface area for its weight or a reducible nickel compound. When metallic nickel is used it should be in the form of a colloid, fine powder or porous solid such as reduced nickel adhered to carriers or Raney type nickel. The nickel compounds used in this invention are those nickel compounds that are capable of being reduced by the above-described lithium-aluminum hydride or organometallic compounds. In the desired reduction reaction the nickel is reduced to a lower valence state. The desired reduction is accomplished by contacting the nickel compound with the above-described organometallic compound or lithiumaluminum hydride.

Suitable reducible nickel compounds include nickel oxide, nickel salts of inorganic acids and organic acids containing up to and including 20 carbon atoms per molecule, nickel salts of beta-diketones of the formula:

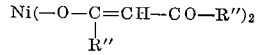

wherein R" is a saturated aliphatic, saturated cycloalphatic or aromatic radical or combination thereof, containing from 1 to 10 carbon atoms, and complex compounds such as dicyclopentadienylnickel and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the beta-diketones include the nickel salts of 2,4-pentanedione (acetylacetone), 3,5-heptanedione, 1,5-dicyclopentyl-2,4-pentanedione, and the like. Mixtures of the foregoing nickel components can be used.

Nickel compounds that are reduced with the lithium aluminum hydride or the organometallic compounds are preferred in the process of our invention. Especially preferred are the nickel salts of organic carboxylic acids.

It is within the scope of our invention to utilize nickel components that are supported on various carriers such as diatomaceous earth, silica-alumina, silica, alumina, titania, zirconia, kaolin, ion-exchange resins and the like. The metallic nickel or the reducible nickel compound, such as nickel oxides and the like, can be supported on the above-mentioned carriers.

The ethers used in the present invention preferably contain up to and including 24 carbon atoms per molecule with hydrocarbon radicals each containing from 1 to 12, inclusive, carbon atoms. The ethers are preferably selected from the group consisting of dialkyl ethers, cyclic ethers containing five or six members in a ring and ethers of ethylene glycol. Examples of suitable compounds include dimethyl ether, diethyl ether, diisopropyl ether, di-n-propyl ether, di-n-butyl ether, di-n-octyl ether, didecyl ether, methyl ethyl ether, ethyl n-propyl ether, tert-butyl n-dodecyl ether, n-hexyl n-decyl ether, di-tert-heptyl ether, tetramethylene oxide (tetrahydrofuran), pentamethylene oxide (tetrahydropyran), 1,4-dioxane, 1,2-dimethoxyethane, 1,2-diethoxyethane, 1,2-di-n-propoxyethane, 1,2-methoxyethoxyethane, 1,1-methoxy-n-pentoxyethane, and 1,2-ethoxy-n-hexoxyethane, 1,2-di-n-nonoxyethane. Most preferred ethers are tetrahydrofuran, tetrahydropyran, and 1,4-dioxane.

The catalyst compositions used in this invention are formed by combining the lithium aluminum hydride or the organometallic compound and the nickel component prior to introduction of the molybdenum pentachloride. The lithium aluminum hydride or the organometallic compound and the metallic nickel or the nickel compound can be combined in the presence of a hydrocarbon diluent. Suitable hydrocarbon diluents include those that are also suitable as a polymerization diluent. The diluent can be a paraffinic, cycloparaffinic, or aromatic hydrocarbon such as n-pentane, n-hexane, 2,2,4-trimethylpentane, cyclohexane, benzene, toluene, and the like. The mixture of the lithium aluminum hydride or the organometallic compound and the nickel component is maintained at a temperature in the range of about 20 to 70° C. for a sufficient length of time to produce an active catalyst component. The aging time is dependent upon the particular compounds used and on the temperature of the reaction. Generally, the aging time will be in the range of about 5 minutes to 25 hours. If a reducible nickel compound is used, it undergoes a reduction type reaction wherein the nickel is reduced to a lower valence state during the aging step.

It has been found that when the concentrations of the lithium aluminum hydride or the organometallic compound and the nickel component are quite low, the aging time may have to be increased slightly. After the desired aging has been achieved, the molybdenum pentachloride catalyst component and ether are added to the polymerization zone along with the 1,3-butadiene monomer, and the polymerization reaction is allowed to proceed. The 1,3-butadiene monomer, molybdenum pentachloride, and ether can be added to the polymerization zone in any order.

The ratio of the nickel compound to the lithium aluminum hydride or the organometallic compound is expressed in terms of gram atoms of nickel per gram mol of the lithium aluminum hydride or the organometallic compound. The ratio of the nickel component to the lithium aluminum hydride or the organometallic compound is in the range of 0.25 to 6 gram atoms of nickel per gram mol of lithium aluminum hydride or organometallic compound with from 0.5 to 3 gram atoms per gram mol being preferred. The mol ratio of the molybdenum pentachloride to the lithium aluminum hydride or the organometallic compound is in the range of 0.1:1 to 25:1, preferably from 1:1 to 12:1.

The total amount of molybdenum pentachloride, lithium aluminum hydride or organometallic compound, and nickel component in the polymerization system is based on the nickel component and is generally in the range of about 0.25 to 10, preferably 1 to 4, milligram atoms of nickel per 100 grams of the monomer.

The amount of ether used in the polymerization system is generally in the range of about 3 to 150, preferably 10 to 100 parts by weight of the ether per 100 parts of 1,3-butadiene. The amount employed depends upon the structure desired in the polymer and is governed to some extent by the particular ether chosen. Preferably conditions are adjusted so that the polymer has a cis content below 5 percent, and a trans content above 12 and generally between 15 and 35 percent. The most preferred trans-vinyl polymer has a cis content of 0 to 0.5 percent and a trans content of 15 to 35.

It has been found that at any given mol ratio of the nickel component and the molybdenum pentachloride to the lithium aluminum hydride or the organometallic compound, within the above-described limits, an increase in the ether level results in a decrease in the cis content, an increase in the trans content, and a decrease in the vinyl content of the polybutadiene produced in the polymerization system. Thus, this invention provides a means for controlling the microstructure of the polybutadiene product by varying the quantity of the ether component.

The polymerization is generally carried out in the presence of a hydrocarbon diluent. Suitable diluents include paraffinic, cycloparaffinic and aromatic hydrocarbons such as n-pentane, n-hexane, 2,2,4-trimethyl pentane, cyclohexane, benzene, toluene, and the like, and mixtures of the above. It is desirable to carry out the polymerization at a pressure such that at least a portion of the 1,3-butadiene monomer is in the liquid phase. The polymerization is usually carried out at a temperature in the range of 0 to 250° F. with a temperature in the range of 50 to 200° F. being preferred. When the desired degree of conversion has been reached the polymerization reaction is terminated and the polymer recovered by any conventional means such as by alcohol coagulation, seperation of the polymer crumb, and drying.

The polymer products produced in accordance with this invention have properties that make them valuable for a variety of commercial applications. The polymers produced in accordance with this invention which have virtually no cis content have particularly good aging and ozone resistance properties as well as low heat buildup. These properties make them useful in tire tread and carcass applications either alone or in admixture with other types of synthetic rubbers as well as in blends with natural rubber. The polymers also have good adhesive characteristics and therefore can be used in coating compositions or adhesive compositions, such as in the manufacture of pressure sensitive tape. Polymers prepared in accordance with this invention can be compounded and vulcanized using known reinforcing agents, vulcanizing agents, vulcanization accelerators, antioxidants, softeners, extenders, fillers, and the like.

It will be apparent to those skilled in the art that various modifications and changes may be made in the foregoing disclosure without departing from the spirit and scope of our invention.

The following examples are submitted to illustrate preferred embodiments of our invention. The examples should not be considered in such a way as to unduly limit the scope of our invention. Microstructure and inherent viscosity determinations in the examples were made according to the procedure shown in U.S. 3,215,682. Mooney viscosity values were determined according to the procedure of ASTM D-1646-63.

EXAMPLE I

The effect of using tetrahydrofuran and 1,4-dioxane as the ether adjuvant on the microstructure of polybutadiene prepared by the polymerization of butadiene in the presence of a catalyst formed from nickel stearate or nickel naphthenate, triethylaluminum, and molybdenum pentachloride was demonstrated using the following polymerization recipes and procedures:

|  | A | B | C | D |
|---|---|---|---|---|
| 1,3-butadiene, parts by wt | 100 | 100 | 100 | 100 |
| Cyclohexane, parts by wt | 1,600 | 1,600 | 1,600 | 1,609 |
| Nickel stearate, mhm.[1] | 4 | 4 | | |
| Nickel naphthenate, mhm | | | 2 | 2 |
| Triethylaluminum, mhm | 8 | 8 | 4 | 4 |
| Molybdenum pentachloride, mhm | 2 | 5 | 2 | 2 |
| Tetrahydrofuran, parts by wt | (²) | (²) | (²) | |
| 1,4-dioxane, parts by wt | | | | (²) |
| Temperature, °F | 122 | 122 | 122 | 122 |
| Time, hours | 16 | 16 | 17 | 17 |

[1] mhm.=gram millimoles per 100 grams monomer.
[2] Variable.

In each run the nickel stearate or nickel naphthenate and triethylaluminum were admixed prior to being charged to the polymerization. In doing this the nickel compound was charged to a vessel and cyclohexane was added to form a suspension. The vessel was purged with nitrogen after which triethylaluminum dissolved in cyclohexane was introduced. The mixture was aged for at least one hour (aging time ranged from 1 to 5 hours) at room temperature (about 76° F.)

When conducting polymerizations according to recipes A and B, cyclohexane was charged first after which the reactor was purged with nitrogen. Butadiene was added to the vessel, followed by the compound formed on admixture of nickel stearate and triethylaluminum, and then the tetrahydrofuran. The temperature was adjusted to 122° F. and a suspension of a molybdenum pentachloride in cyclohexane was introduced. The mixture was agitated for 16 hours and the temperature was maintained at 122° F. Each reaction was terminated with a 10 weight percent solution of 2,2'-methylene-bis(4-methyl-6 - tert - butylphenol) in a mixture of equal parts by weight of isopropyl alcohol and toluene, the amount used being sufficient to provide approximately 1 part by weight of the antioxidant per 100 parts by weight of the polymer. The polymers were coagulated in isopropyl alcohol, separated, and dried in a vacuum oven. The products were gel free.

A similar procedure was followed for conducting polymerization using recipes C and D except that the tetrahydrofuran or 1,4-dioxane was added to the reactor prior to the nickel naphthenate-triethylaluminum reaction mixture. Polymers were recovered in the manner previously described. Results were as follows:

Compounding recipe

| | Parts by weight |
|---|---|
| Polymer | 100 |
| High abrasion furnace black | 50 |
| Zinc oxide | 3 |
| Stearic acid | 2 |
| Flexamine[1] | 1 |
| Aromatic oil | 10 |
| Sulfur | 1.75 |
| NOBS Special[2] | 0.85 |

Physical properties

| | |
|---|---|
| Raw Mooney, ML-4 at 212° F. | 72 |
| Compounded Mooney, ML-4 at 212° F. | 78.3 |
| Green tensile, p.s.i., raw stock | 38 |

Cured 30 minutes at 307° F.

| | |
|---|---|
| 300% modulus, p.s.i.[3] | 1185 |
| Tensile, p.s.i.[3] | 1300 |
| Elongation, percent[3] | 320 |
| Heat buildup, ° F.[4] | 49.4 |
| Resilience, percent[5] | 69.9 |
| Blowout time, minutes[6] | 24.2 |
| Shore A hardness[7] | 61.5 |

[1] Physical mixture containing 65 percent of a complex diarylamineketone reaction product and 35 percent of N,N-diphenyl-p-phenylenediamine.
[2] N-oxydiethylene-2-benzothiazolesulfenamide.
[3] Determined by the procedure outlined in ASTM D-412-62T at a temperature of 80° F.
[4] Determined by the procedure outlined in ASTM D-623-62T, Method A, Goodrich Flexometer, 143 lb./sq. in. load, 0.175 inch stroke. Test specimen is a right circular cylinder 0.7 inch in diameter and 1 inch high.
[5] Determined by the procedure outline in ASTM D-945-59.

| Run No. | Recipe | Adjuvant Type | Parts | Conv., percent | Inh. Visc. | Microstructure, percent | | |
|---|---|---|---|---|---|---|---|---|
| | | | | | | cis | trans | Vinyl |
| 1 | A | Tetrahydrofuran | 0 | 48 | 8.4 | 5.3 | 8.4 | 86.3 |
| 2 | A | do | 10.6 | 60 | 6.8 | 2.4 | 24.5 | 73.1 |
| 3 | A | do | 35.5 | 56 | 9.4 | 1.4 | 33.8 | 64.8 |
| 4 | B | do | 3.5 | 78 | 7.08 | 4.3 | 13.8 | 81.9 |
| 5 | B | do | 10.6 | 72 | 6.48 | 4.1 | 19.1 | 77.8 |
| 6 | B | do | 81 | 30 | 6.29 | 0 | 29.4 | 71.5 |
| 7 | C | do | 0 | 73 | 5.65 | 1.9 | 10.4 | 87.7 |
| 8 | C | do | 17.7 | 80 | 6.41 | 1.3 | 25.8 | 72.9 |
| 9 | C | do | 35.5 | 71 | 7.81 | 1.1 | 29.9 | 69.0 |
| 10 | C | do | 71 | 60.5 | 7.71 | 0.5 | 32.9 | 66.0 |
| 11 | D | 1,4-dioxane | 4.1 | 78 | 5.81 | 0 | 12.1 | 88.9 |
| 12 | D | do | 20.6 | 82.5 | 5.93 | 0 | 17.6 | 82.6 |
| 13 | D | do | 82.6 | 62.5 | 7.56 | 0.1 | 23.4 | 76.5 |

The data show that in each series of runs as the amount of ether was increased the cis and vinyl content decreased and the transcontent increased. The polymer in run 7, prepared in the absence of ether, had a low cis content, but the cis was reduced and the trans increased as the amount of ether component was increased. The polymer from run 10 in which tetrahydrofuran was employed had a very low cis content. There was essentially no cis content in the polymers prepared in runs 11-13 in which the ether component employed was 1,4-dioxane.

EXAMPLE II

A polymer, having 0.0 percent cis, 30.0 percent trans, and 70.0 percent vinyl, made by the process illustrated in Example I was evaluated in a tread stock recipe. Following are the data:

Polymerization receipe

| | Parts by weight |
|---|---|
| 1,3-butadiene | 100 |
| Cyclohexane | 800 |
| Tetrahydrofuran | 26.4 |
| Nickel stearate, mhm. | 2.0 |
| Triethylaluminum, mhm. | 4.0 |
| Molybdenum pentachloride, mhm. | 2.0 |
| Temperature, °F. | 122 |
| Time, hours | 3 |
| Conversion, percent | 40 |
| Inherent viscosity | 6-7 |

Yerzley Oscillograph. Test specimen is a right circular cylinder 0.7 inch in diameter and 1 inch high.
[6] Goodrich Flexometer, 257 lb./sq. in. load, 0.250 inch stroke, 200° F. oven temperature. Reported as running time to failure of test specimen.
[7] Determined by the procedure outlined in ASTM D-1706-61. Shore Durometer, Type A.

The data show that the high trans-vinyl polybutadiene had low heat buildup and a long blowout time.

What is claimed is:

1. A process for polymerizing 1,3-butadiene which comprises contacting said butadiene under polymerization conditions with a catalyst composition which forms on mixing components comprising: (1) molybdenum pentachloride; (2) lithium aluminum hydride or at least one organometallic compound having the formula $R_mAlCl_n$, $LiAlH_xR_{(4-x)}$ or $R_yM$ wherein R is a saturated aliphatic, saturated cycloaliphatic, or aromatic radical, or combination thereof, containing from 1 to 20 carbon atoms, $m$ and $n$ are integers of 1 or 2 such that $m+n$ is 3, $x$ is an integer of 1 to 3, M is lithium, sodium, potassium, rubidium, cesium, beryllium, magnesium, zinc, calcium, cadmium, aluminum, gallium or indium, and $y$ is an integer equal to the valence of M; and (3) a nickel component selected from the group consisting of metallic nickel having large surface area for its weight and a reducible nickel compound capable of being reduced by said lithium aluminum hydride or said organometallic compound, in the presence of from 3 to 150 parts by weight of a mono- or di-ether, per 100 parts of butadiene, said ether containing up to and including 24 carbon atoms per molecule with hydrocarbon radicals each containing from 1 to 12, inclusive, carbon atoms.

2. The process of claim 1 wherein said ether compound is selected from the group consisting of dialkyl ethers, cyclic ethers containing 5 or 6 members in a ring, and ethers of ethylene glycol.

3. The process of claim 2 wherein the ratio of said nickel component to said lithium aluminum hydride or said organometallic compound is in the range of 0.25 to 6 gram atoms of nickel per gram mol of lithium aluminum hydride or organometallic compound, the mol ratio of said molybdenum pentachloride to said lithium aluminum hydride or said organometallic compound is in the range of 0.1:1 to 25:1, and from 10 to 100 parts by weight of said ether are added per 100 parts of butadiene.

4. The process of claim 3 wherein said ether is tetrahydrofuran.

5. The process of claim 3 wherein said ether is 1,4-dioxane.

6. The process of claim 3 wherein said contacting takes place in the presence of a diluent selected from the group consisting of paraffins, cycloparaffins and aromatics.

7. The process of claim 3 wherein said contacting takes place at a temperature in the range of about 0 to 250° F.

8. The process of claim 7 wherein said catalyst is formed from nickel stearate, triethylaluminum and molybdenum pentachloride, and said ether is tetrahydrofuran.

9. The process of claim 7 wherein said catalyst is formed from nickel naphthenate, triethylaluminum and molybdenum pentachloride, and said ether is 1,4-dioxane.

References Cited

UNITED STATES PATENTS 3,031,441  4/1962  Verheyden _____ 260—94.3

FOREIGN PATENTS 919,521  2/1963  Great Britain.

JOSEPH L. SCHOFER, Primary Examiner

R. A. GAITHER, Assistant Examiner